(12) United States Patent
Wilson et al.

(10) Patent No.: US 10,697,682 B2
(45) Date of Patent: Jun. 30, 2020

(54) MOTOR ASSEMBLY WITH INTEGRATED ON/OFF DETECTION WITH SPEED PROFILE OPERATION

(71) Applicant: Regal Beloit America, Inc., Beloit, WI (US)

(72) Inventors: Jeffrey A. Wilson, Waynesville, OH (US); Guy Bonner, Markle, IN (US); Vijay Earanky, Beloit, WI (US); Marc C. McKinzie, West Milton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/880,661

(22) Filed: Oct. 12, 2015

(65) Prior Publication Data

US 2016/0097575 A1    Apr. 7, 2016

Related U.S. Application Data

(63) Continuation of application No. 13/782,023, filed on Mar. 1, 2013, now Pat. No. 9,160,269.

(51) Int. Cl.
*H02P 29/20*  (2016.01)
*H02P 23/24*  (2016.01)
(Continued)

(52) U.S. Cl.
CPC ........ *F25B 49/025* (2013.01); *H02P 23/0004* (2013.01); *H02P 23/14* (2013.01); *H02P 23/24* (2016.02); *H02P 29/20* (2016.02)

(58) Field of Classification Search
USPC .... 318/400.9, 803, 768, 749, 771, 781, 490, 318/490.14, 400.21, 400; 702/60;
(Continued)

(56) References Cited

U.S. PATENT DOCUMENTS 5,625,548 A  *  4/1997  Gold ....................... H02M 1/08
                                                            363/98
5,883,473 A  *  3/1999  Li ........................ H05B 41/2855
                                                            315/209 R
(Continued)

FOREIGN PATENT DOCUMENTS

CN          102282755         12/2011

OTHER PUBLICATIONS

First Office Action from the State Intellectual Property Office of China for Application No. 201410153539.0 dated Jun. 2017 (19 pages).
(Continued)

*Primary Examiner* — Jorge L Carrasquillo
(74) *Attorney, Agent, or Firm* — Michael Best and Friedrich LLP

(57) ABSTRACT

A motor assembly configured to receive an external alternating voltage. The motor assembly includes a motor and a circuit assembly. The motor includes a stator and a rotor rotatable about a longitudinal axis. The circuit assembly includes a state detector and a control unit. The state detector is operable to detect whether an external device is receiving the external alternating voltage The control unit is operable to control the motor based on whether the external device is receiving the external alternating voltage.

20 Claims, 7 Drawing Sheets

(51) Int. Cl.
*F25B 49/02* (2006.01)
*H02P 23/14* (2006.01)
*H02P 23/00* (2016.01)

(58) Field of Classification Search
USPC ............. 361/18; 236/49.3, 68 B; 62/89, 186,
62/255, 428, 180, 216, 158, 183
See application file for complete search history.

(56) References Cited

U.S. PATENT DOCUMENTS

| | | | | |
|---|---|---|---|---|
| 6,351,601 B1* | 2/2002 | Judkins | ................... | H02P 7/285 |
| | | | | 318/139 |
| 6,357,667 B1* | 3/2002 | Young | ................ | G05D 23/1905 |
| | | | | 236/49.3 |
| 8,106,670 B2* | 1/2012 | Gass | .................. | G01R 19/0084 |
| | | | | 324/509 |
| 2003/0234591 A1* | 12/2003 | Smith | ................... | H02K 21/14 |
| | | | | 310/156.49 |
| 2005/0115258 A1* | 6/2005 | Violand | .................. | F24F 1/027 |
| | | | | 62/186 |
| 2006/0288714 A1* | 12/2006 | Joyner | ................... | F04D 25/08 |
| | | | | 62/183 |
| 2007/0273312 A1* | 11/2007 | Sakurai | ................... | H02M 1/38 |
| | | | | 318/543 |
| 2008/0245085 A1 | 10/2008 | Jaffer | | |
| 2010/0060215 A1* | 3/2010 | Woodward | ................ | H02P 1/16 |
| | | | | 318/400.09 |
| 2010/0127691 A1* | 5/2010 | Gass | .................. | G01R 19/0084 |
| | | | | 324/76.11 |
| 2010/0226051 A1* | 9/2010 | Nair | ..................... | H02H 7/1222 |
| | | | | 361/18 |
| 2011/0279070 A1* | 11/2011 | Tanaka | ................... | H02P 6/181 |
| | | | | 318/400.1 |

OTHER PUBLICATIONS

Second Office Action from the Chinese Patent Office for Application No. 201410153539.0 dated May 28, 2018 (9 pages).

* cited by examiner

MOTOR ASSEMBLY WITH INTEGRATED ON/OFF DETECTION WITH SPEED PROFILE OPERATION

CROSS-REFERENCE TO RELATED CASES

This application claims the benefit to co-pending U.S. patent application Ser. No. 13/782,023, filed Mar. 1, 2013, the entire contents of which are incorporated herein by reference.

BACKGROUND

The present invention relates to motor assemblies to drive fans in refrigeration systems. Motor assemblies coupled to fans are included in refrigeration systems to help cool components of the system or to circulate the refrigerated air.

SUMMARY

In one embodiment, the invention provides a motor assembly configured to receive an external alternating voltage. The motor assembly includes a motor and a circuit assembly. The motor includes a stator and a rotor rotatable about a longitudinal axis. The circuit assembly includes a state detector and a control unit. The state detector is operable to detect whether an external device is receiving the external alternating voltage The control unit is operable to control the motor based on whether the external device is receiving the external alternating voltage.

In some embodiments, the control unit controls the motor by applying one of a plurality of configurable speed profiles in response to the state of the external alternating voltage input. The speed profiles are programmable by the control unit receiving an input regarding a characteristic of the speed profiles, wherein the characteristic of the speed profiles to be programmed is the rotational speed as a function of time.

In some embodiments, the state detector includes a first and a second logic output signal received by the control unit, the first logic output signal indicates whether the external alternating voltage input is equal to a neutral connection and the second logic output signal indicates whether the external alternating voltage is equal to a line connection.

In other embodiments, the first logic output signal indicates whether the external alternating voltage input is equal to a first line connection and the second logic output signal indicates whether the external alternating voltage is equal to a second line connection. The control unit determines whether an external motor connected to the external alternating voltage is operating based on the first logic output signal and the second logic output signal.

In another embodiment, the invention provides a refrigeration system including a line input, a neutral input, a compressor electrically coupled to the line input and the neutral input, and a motor. The motor includes a stator, a rotor, a state detector, and a control unit. The state detector is electrically coupled to the line input, the neutral input, and the compressor. The state detector is configured to output a first signal indicating that the compressor is electrically coupled to the line input and the neutral input, and a second signal indicating that the compressor is not electrically coupled to the line input. The control unit is operable to receive at least one selected from the group consisting of the first signal and the second signal, and control the motor based on the received signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
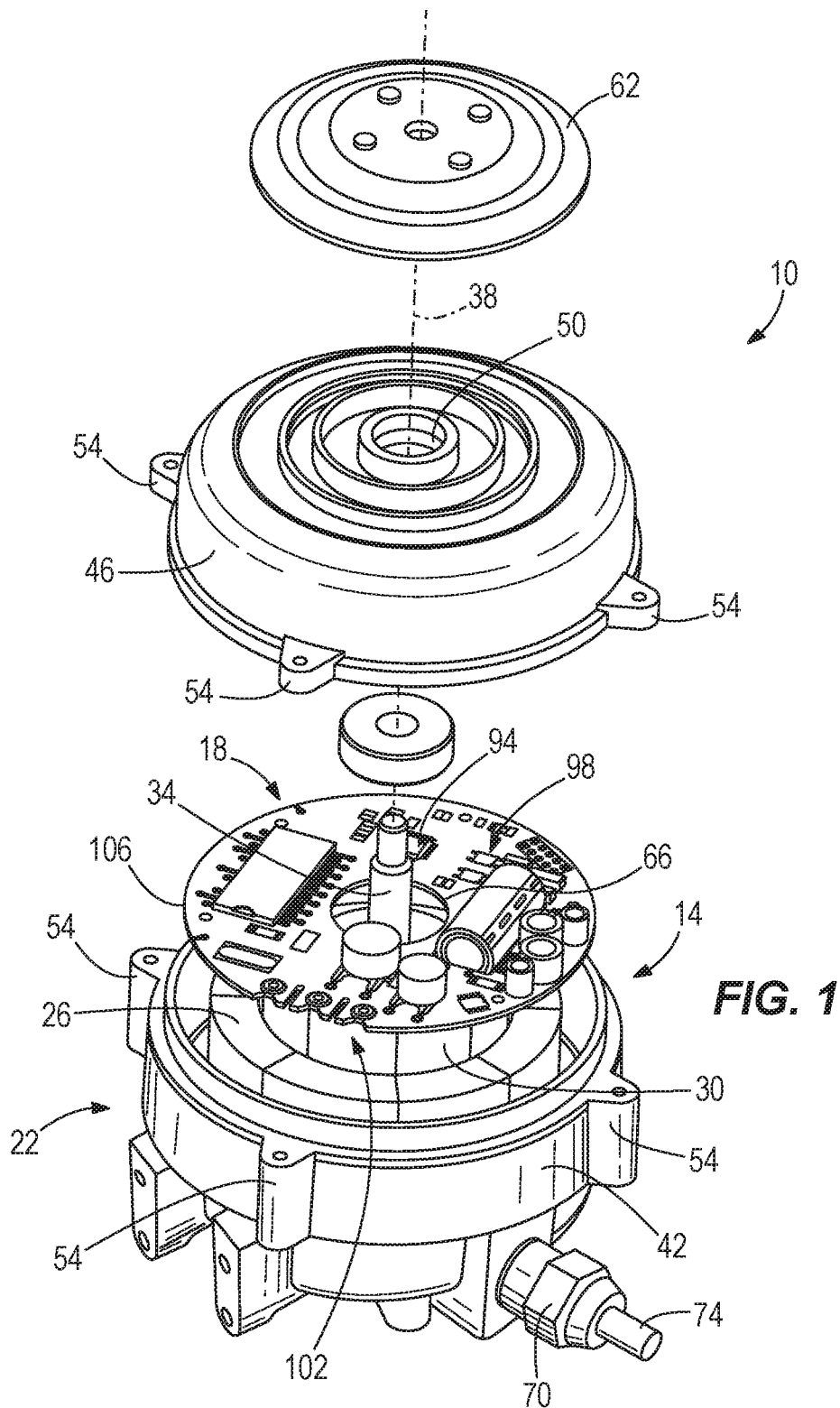
FIG. 1 is an exploded view of a motor assembly.

FIG. 1 illustrates a motor assembly 10 including an electric motor 14, a circuit assembly 18, and a housing 22 encasing the motor 14 and circuit assembly 18. The electric motor 14 includes a stator 26 mounted within the housing 22 and a rotor 30 having a shaft 34 defining a longitudinal axis 38. Electrical excitation applied to the stator 26 creates rotation of the rotor 30 about the rotational axis 38.

The housing 22 consists of a motor case 42 substantially surrounding the motor 14, and a front cover 46. The front cover 46 substantially surrounds the circuit assembly 18 and includes an aperture 50 for receiving the rotor shaft 34. A plurality of lugs 54 couple the front cover 46 to the motor case 42 using a plurality of fasteners 58. A moisture shield 62 is provided to prevent moisture from entering the housing 22 by creating a labyrinth seal. When the moisture shield 62 is attached to the front cover 46, the shaft 34 of the rotor 30 extends through the central aperture 50 of the front cover 46 and through a central aperture 66 of the circuit assembly 18. An electrical input bushing 70 on the motor case 42 receives an electrical cord 74 containing electrical connections for powering the electrical motor 14 and circuit assembly 18. In some constructions, additional electrical connections are provided for communication between the circuit assembly 18 and external devices.

Figure 2:
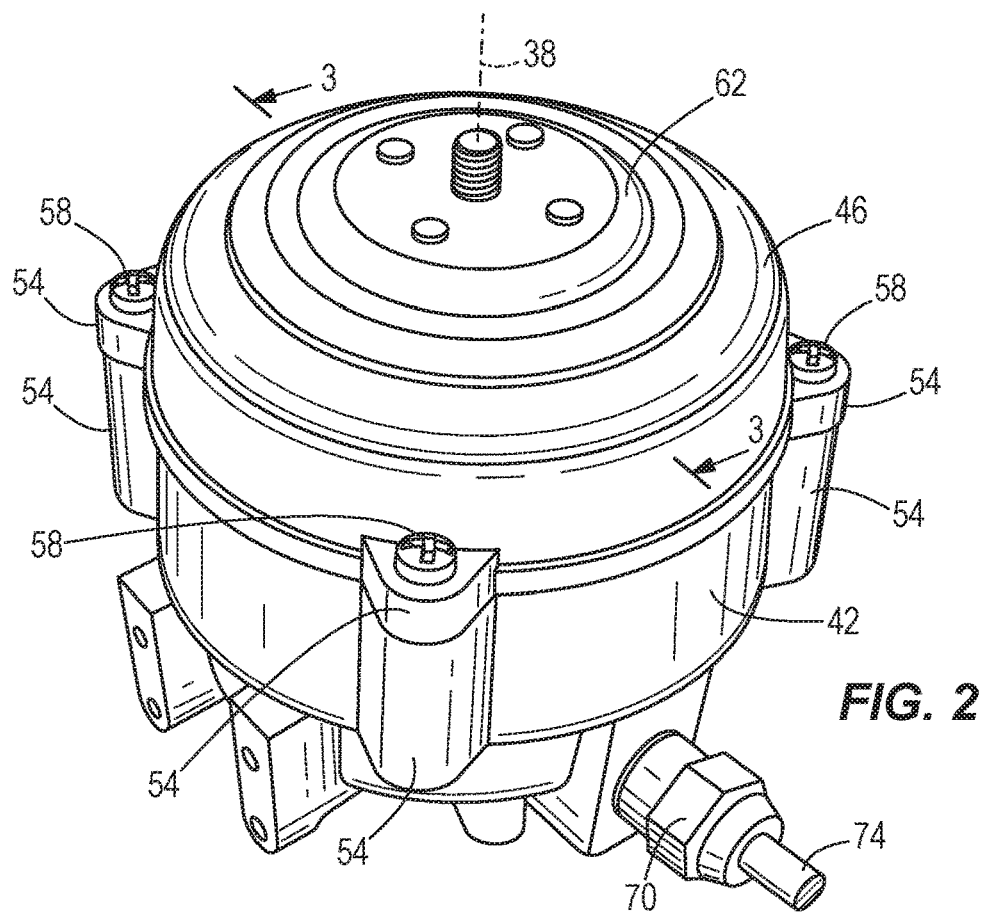
FIG. 2 is a perspective view of the motor assembly of FIG. 1.
Figure 3:
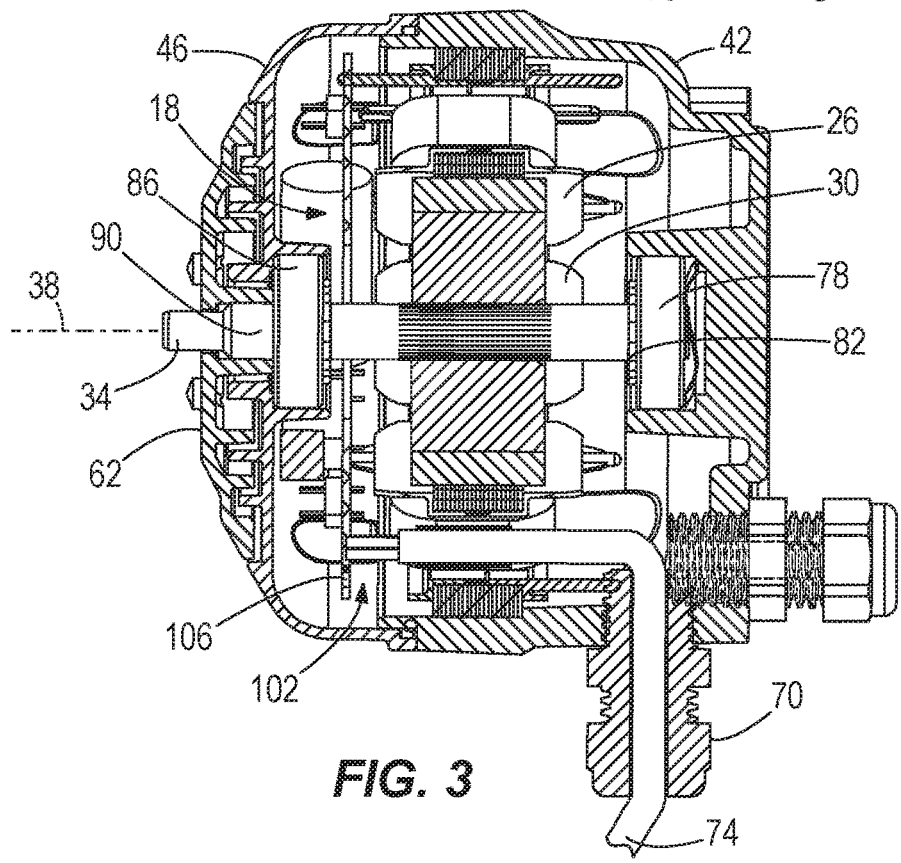
FIG. 3 is a cross-sectional view of the motor assembly of FIG. 1.

FIGS. 2 and 3 illustrate the assembled motor 10 with the front cover 46 and the moisture shield 62 attached to the motor case 42. As shown in FIG. 2, the motor case 42 includes a first bearing 78 to support a first end of the shaft 82, and the front cover 46 includes a second bearing 86 to support a second end of the shaft 90.

Figure 4:
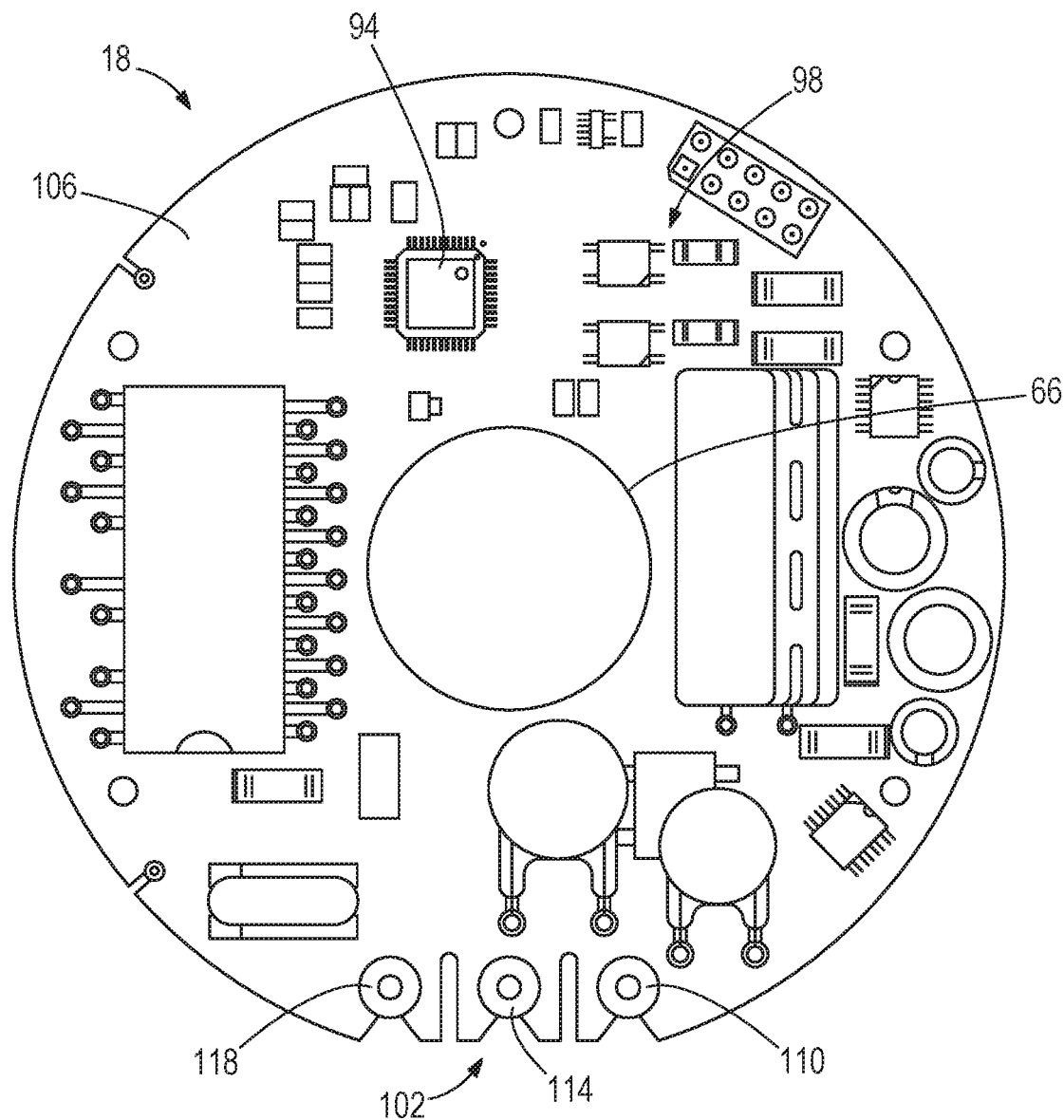
FIG. 4 is a top view of a circuit assembly.

FIG. 4 illustrates the circuit assembly 18 in further detail. A control unit 94 (e.g., a microcontroller), a state detection circuit 98, and a plurality of voltage connections 102 are all mounted on a disc-shaped circuit board 106. The central aperture 66 of the circuit board 106 allows the shaft 34 of the rotor 30 to pass through when the circuit board 106 is mounted within the front cover 46. The control unit 94 provides a processor that executes instructions stored in a memory of the control unit. Although the example of FIG. 4 illustrates a single control unit 94 that includes both a processor and a memory, some alternative constructions include separate processor and memory components.

The circuit assembly 18 includes a first input voltage 110 connection for a line voltage and a second input voltage connection 114 for a neutral voltage (e.g. in a 115 VAC system). In other constructions, the first input voltage connection receives a first line voltage and the second input voltage connection receives a second line voltage (e.g., in a 230 VAC system). The circuit assembly also includes a discrete high voltage input 118 ("DHV input"). The DHV input 118 is an external alternating voltage input for an external motor (e.g., a compressor motor).

The control unit 94 is operable to control the motor 14 by applying input voltages derived from connections 110, 114 to the motor 14 as desired. The state detection circuit 98 provides galvanic isolation for the control unit 94 from the voltage connections 102. The state detection circuit 98 also determines the state of the DHV input 118 relative to the two input voltage connections 110, 114. Both of the input voltage connections 110, 114 and the DHV input 118 enter the housing 22 at the electrical input bushing 70 formed on the motor case 42.

Figure 5:
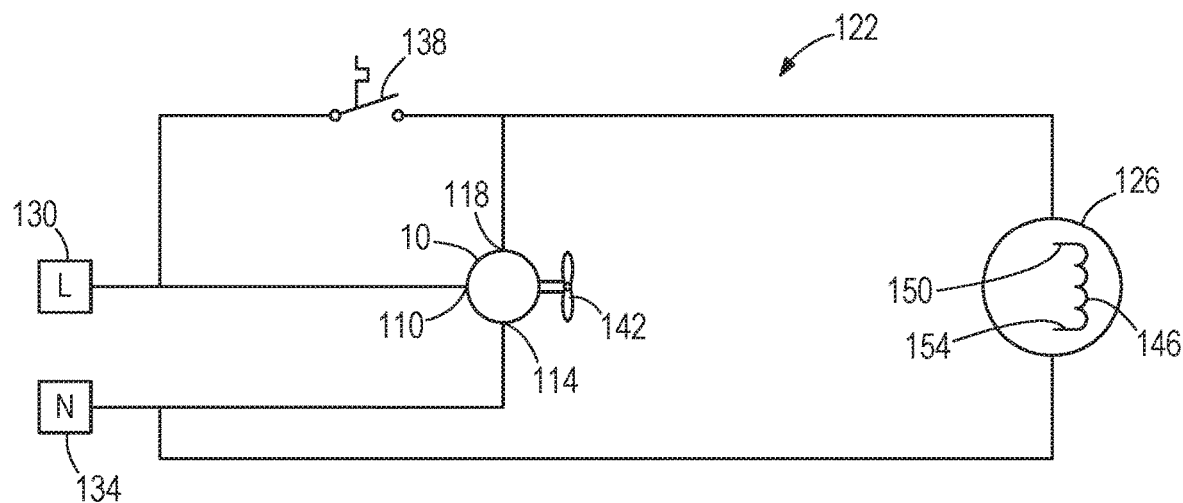
FIG. 5 is a circuit schematic of a system including the motor assembly of FIG. 1.

As illustrated in FIG. 5, the motor assembly 10 can be connected in a refrigerator compressor motor system 122. The refrigerator compressor motor system 122 includes a compressor motor 126, a line voltage connection 130, a neutral voltage connection 134, a thermostat 138 connected between the line voltage connection 130 and the compressor motor 126, and the motor assembly 10 coupled to a fan 142. The compressor motor 126 includes a winding 146 having a first voltage connection 150 and a second voltage connection 154.

The compressor motor 126 compresses a refrigerant for use in a refrigerant cycle when the line voltage 130 and the neutral voltage 134 are applied, respectively, to the first 150 and second 154 connections of the compressor motor 126. The thermostat 138 selectively connects the compressor motor 126 to the line voltage connection 130 when triggered by the refrigeration system to begin cooling (i.e., the temperature is above the desired set temperature). The motor assembly 10 is connected to the line voltage connection 130 and neutral voltage connection 134 as well as the first voltage connection of the compressor 150 (i.e., the DHV input).

In the example of FIG. 5, the motor assembly 10 is coupled to the fan 142 for co-rotation with the rotor 30. The fan 142 can be used to cool a number of components in a refrigerator system. For example, the fan 142 can be used to discharge heat from the refrigerant while the refrigerant passes through a condenser, or the fan 142 can cool a refrigerated space by circulating refrigerated air as refrigerant passes through an evaporator. In another embodiment, the fan 142 can cool the compressor motor 126 when the compressor motor 126 is operating (i.e., when the compressor motor 126 is connected to the line 130 and neutral 134 voltage connections). The operation of the motor assembly 10 can be changed when the compressor motor 126 is not operating. For example, the speed of the motor assembly 10 can be reduced to save energy when the compressor motor 126 is not running, since cooling of the refrigerant is not necessary (i.e., the refrigerator system is off). Alternatively, the motor assembly 10 including the fan 142 can be used to perform maintenance operations such as, for example, clearing the condenser coils by operating in reverse. Furthermore, in some constructions, it is desirable to periodically operate the fan 142 while the compressor motor 126 is off to circulate air in the refrigerated space.

In order to operate the motor assembly 10 based upon the state of the compressor motor 126, the motor assembly 10 determines whether the compressor motor 126 is on or off. However, when the thermostat 138 disconnects the compressor motor 126 from the line voltage 130 as shown in FIG. 5, the neutral voltage 134 at the second voltage connection 154 of the compressor motor 126 induces a voltage response at the first voltage connection 150 through the compressor winding 150. As a result of the induced voltage at the first voltage connection 150 of the compressor motor 126, the motor assembly 10 cannot determine whether the compressor motor 126 is operating (i.e., connected to the line voltage 130) by simple voltage measurement of the DHV input 118. Instead, a state detection circuit 98 incorporated into the circuit assembly 18 indicates whether the compressor motor 126 is connected to the line voltage connection 130 by evaluating the DHV input 118 relative to the line 110 and the neutral 114 connections.

Figure 6:
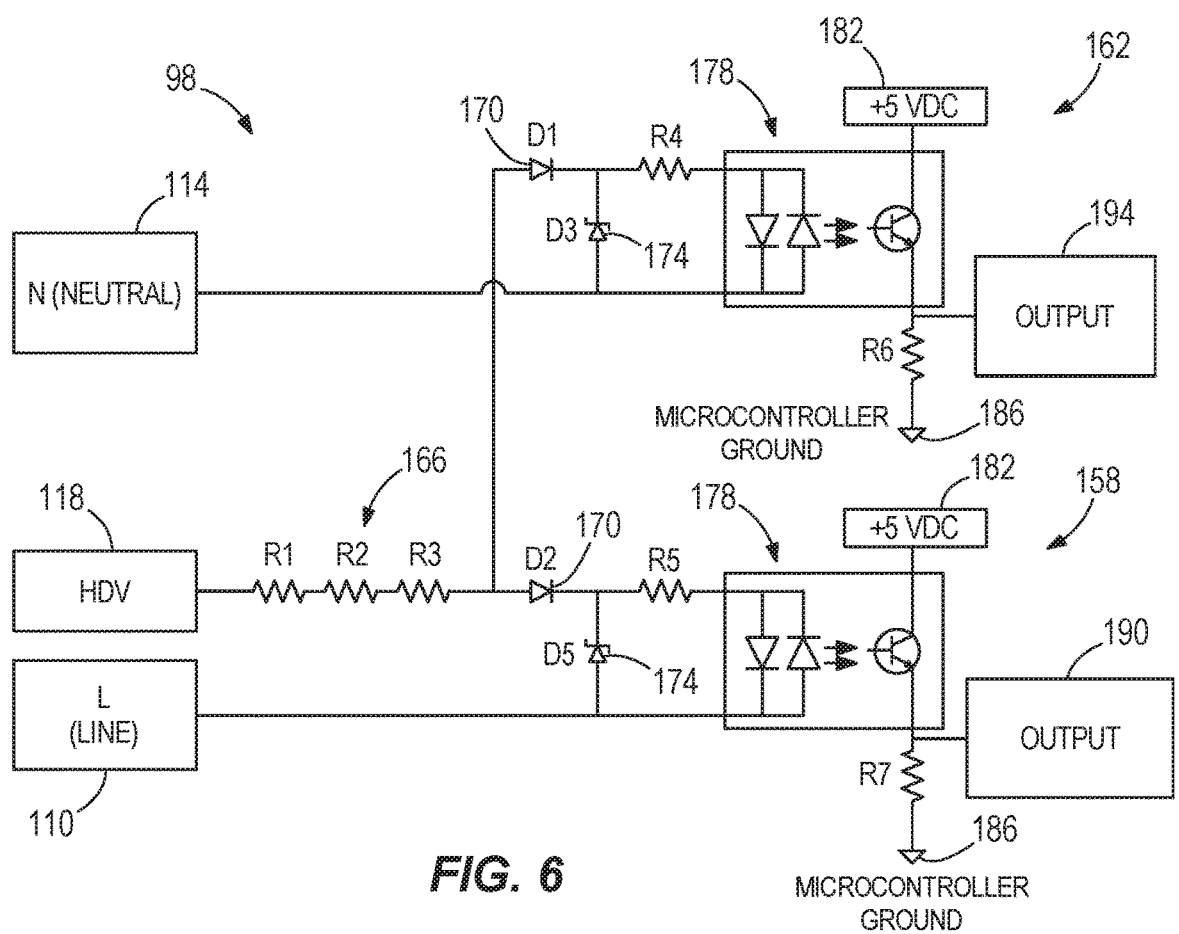
FIG. 6 is a circuit schematic of a detection circuit included in the circuit assembly of FIG. 4.

FIG. 6 illustrates an example of the state detection circuit 98 that is incorporated into the circuit assembly 18 of the motor assembly 10. The state detection circuit 98 is connected to the input voltage connections 110, 114 (e.g., line and neutral in a 115 VAC system, or a first line and a second line voltage in a 230 VAC system) and the DHV input connection 118 (e.g., the first voltage connection of the compressor). The state detection circuit 98 includes a first sub-circuit 158 and second sub-circuit 162 each having two voltage connections. Similar components that are included in both of the sub-circuits are referenced herein by the same reference numerals.

The first sub-circuit 158 is connected to one of the input voltage connections 110 (e.g., line voltage) and the second sub-circuit 162 is connected to the other input voltage connection 114 (e.g., neutral voltage). Both of the sub-circuits are connected to the DHV input connection 118 through a series input resistance 166. The sub-circuits 158, 162 each include a diode 170 (e.g., a 600V, 1 A diode), a Zener diode 174 (e.g., a 15 V Zener diode), and an optical isolation circuit 178 (e.g., an optocoupler, or opto-isolator). The optical isolation circuit 178 provides galvanic isolation between the high-voltage inputs 102 and the control unit 94 to minimize the potential damage to the control unit 94.

Each optical isolation circuit 178 includes a logic-level high-voltage connection 182 (e.g., 5 Volts), a logic-level ground connection 186, and a logic output voltage connection 190, 194 corresponding to the first sub-circuit 158 and the second sub-circuit 162, respectively. The logic output voltage connection 190 of the first sub-circuit 158 and the logic output voltage connection 194 of the second sub-circuit 162 are connected to the control unit 94. The logic output voltage connection 190 of the first sub-circuit 158 indicates whether there is a voltage across the pair of diodes that form the input to the optical isolation circuit 178, indicative of a difference between the two voltage connections 110, 118. The logic output voltage connection 194 of the second sub-circuit 162 indicates whether there is a voltage across the input to the optical isolation circuit 178 indicative of a difference between the two voltage connections 114, 118. In other words, the optical isolation circuit logic output 190, 194 is low if no voltage is applied to the input of the optical isolation circuit 178 (i.e., the DHV input 118 is not connected or equal to the voltage input connection 110 or 114), and the optical isolation circuit logic output 190, 194 is high if the voltage at the input of the optical isolation circuit 178 is above a predetermined threshold (i.e., the difference between the DHV input 118 and the voltage input connection 110 or 114 is greater than the predetermined threshold).

Figure 7:
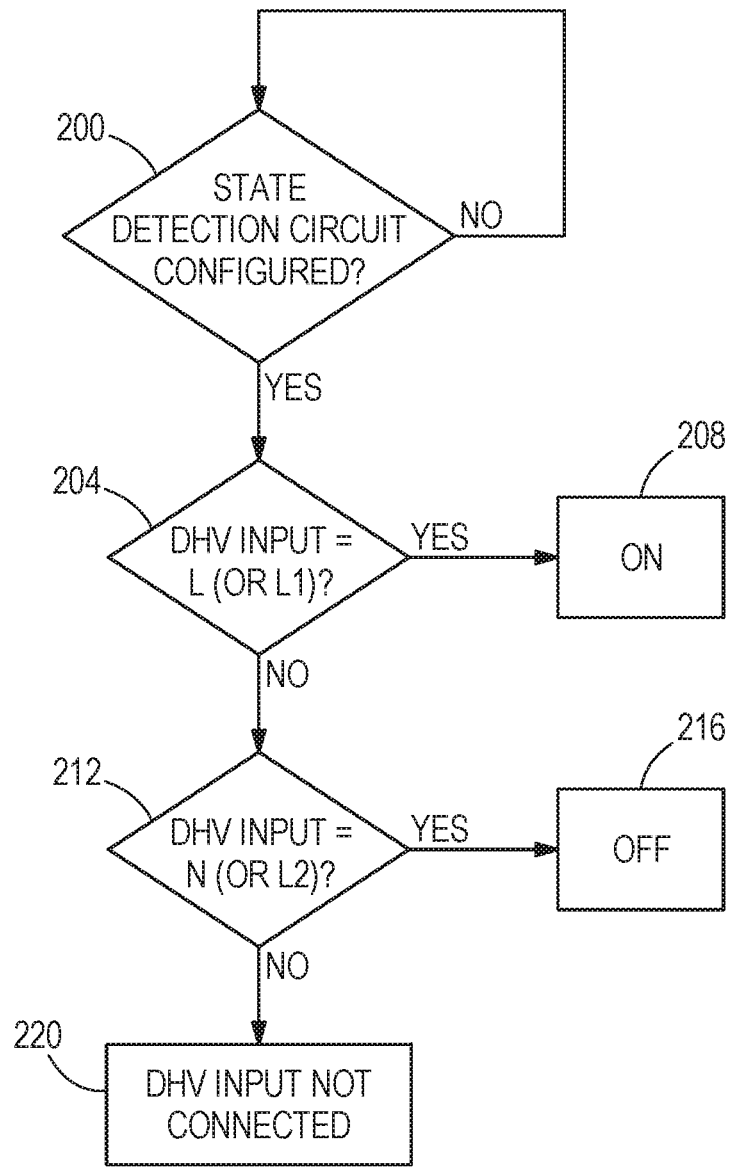
FIG. 7 is a flow chart of a state determining method.

Based on the logic outputs 190, 194 from the two sub-circuits 158, 162, the control unit 94 executes a state determining method stored in the memory. An example of a state determining method is illustrated in FIG. 7 to determine the state of the compressor 126, and to control the motor assembly 10 accordingly. The control unit 94 is configured with speed profiles which are initialized when power is applied to the motor at connections 110, 114 (Step 200). After initialization, the control unit 94 evaluates the output 190 of the first sub-circuit 158 to determine whether the DHV input 118 is equal to the line connection 110 (i.e., the first input voltage) (Step 204). If so, the control unit 94 determines that the compressor motor 126 is turned on, and controls the motor assembly 10 under a first speed profile (Step 208). However, if the DHV input 118 is not the same as the line connection 110, the control unit 94 proceeds to evaluate the output 194 of the second sub-circuit 162 to determine whether the DHV input 118 is equal to the neutral connection 114 (i.e., the second input voltage) (Step 212). If the DHV input is equal to the neutral connection, the control unit 94 determines that the compressor motor 126 is turned off, and controls the motor assembly 10 under a second speed profile (Step 216). If, however, the DHV input is not equal to both the line connection and the neutral connection, the control unit 94 determines that the DHV input is not connected (i.e., the DHV input is an open connection) and controls the motor assembly 10 under a third speed profile (Step 220). In some embodiments, the third speed profile is the same as the second speed profile. After determining the state of the compressor 126 and the control state for the motor assembly 10, the state determining method continues to loop back and begin the state determination again (Step 204).

As described above, after the state of the DHV input is determined, configurable action is taken in response to the state determination. For example, if the state of the compressor motor 126 is determined to be on, the motor assembly 10 executes the first operating speed profile (e.g., continuous operation in one direction) and, when the state of the compressor motor 126 is determined to be off, the motor assembly 10 executes a second operating speed profile (e.g., periodic operation in another direction). The speed profiles are stored in the memory of the control unit 94 and can consist of multiple modes each defining operating characteristics of the motor 14 such as, for example, direction of rotation, speed of rotation, and duration of operation in a specific mode.

Figure 8A:
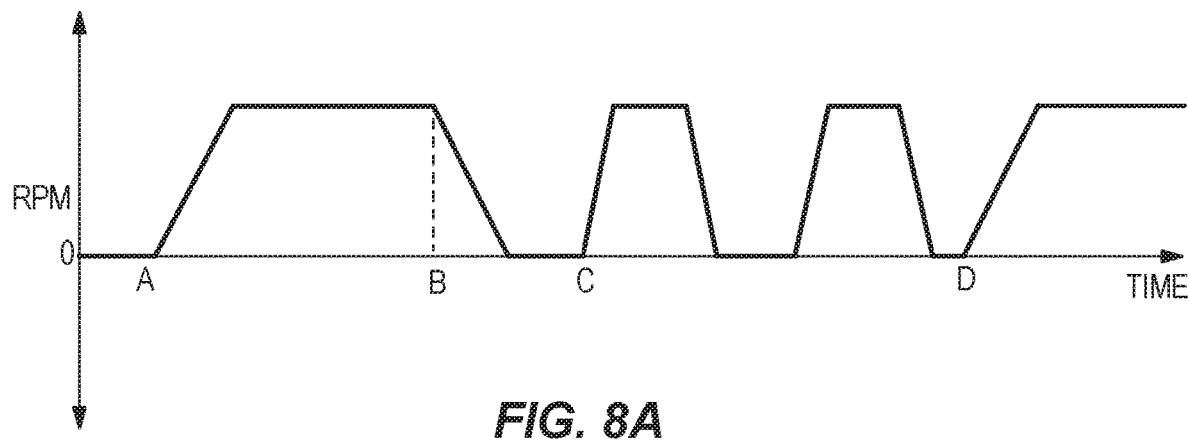
FIG. 8A is a graph of a speed profile for the motor assembly of FIG. 1.

FIG. 8A illustrates one example of the rotational speed (e.g., RPM) of the rotor 30 as a function of time as the motor assembly 10 switches between various speed profiles based on the detected state of the compressor motor 126. The rotor 30 initially starts from a stand still at 0 RPM. At time A, the state detection circuit 98 determines that the compressor motor 126 is on and the control unit 94 ramps up the rotor 30 speed until it reaches a first sustained operating speed. Then, at time B, the state detection circuit 98 determines that the compressor motor 126 has been turned off and the control unit 94 ramps down the rotor 30 speed until it has reached a stand still. After another predetermined time period (time C), the control unit 94 initiates intermittent, periodic operation (e.g., to circulate air in a refrigerated space). The periodic operation continues until time D when the state detection circuit 98 determines that the compressor motor 126 has been turned back on and the control unit 94 ramps up the rotor 30 speed to the first sustained operating speed once more.

Figure 8B:
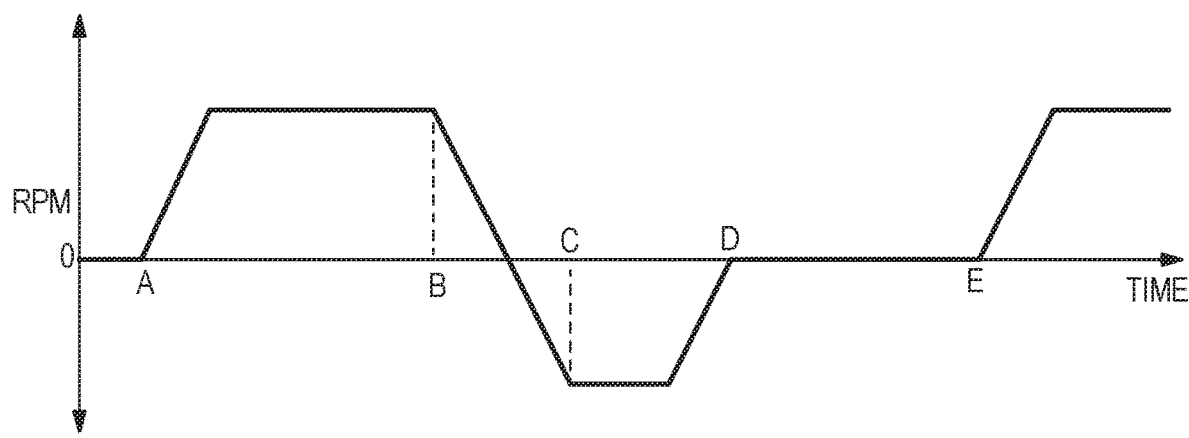
FIG. 8B is a graph of another speed profile for the motor assembly of FIG. 1.

FIG. 8B illustrates another example of the rotational speed (e.g., RPM) of the rotor 30 as a function of time as the motor assembly 10 switches between various speed profiles based on the detected state of the compressor motor 126. The rotor 30 initially starts from a stand still at 0 RPM. At time A, the state detection circuit 98 determines that the compressor motor 126 is on and the control unit 94 ramps up the rotor 30 speed until it reaches a first sustained operating speed. Then, at time B, the state detection circuit 98 determines that the compressor motor 126 has been turned off and the control unit 94 ramps down the rotor 30 speed until it reaches zero. The rotor 30 speed then accelerates until it reaches a sustained reverse speed at time C (e.g., to clear the condenser coils of any debris). After a predetermined time of the sustained reverse speed, the rotor 30 slows to a halt at time D and rotation is held at zero until the state detection circuit 98 determines that the compressor motor 126 has been turned back on at time E.

Figure 9:
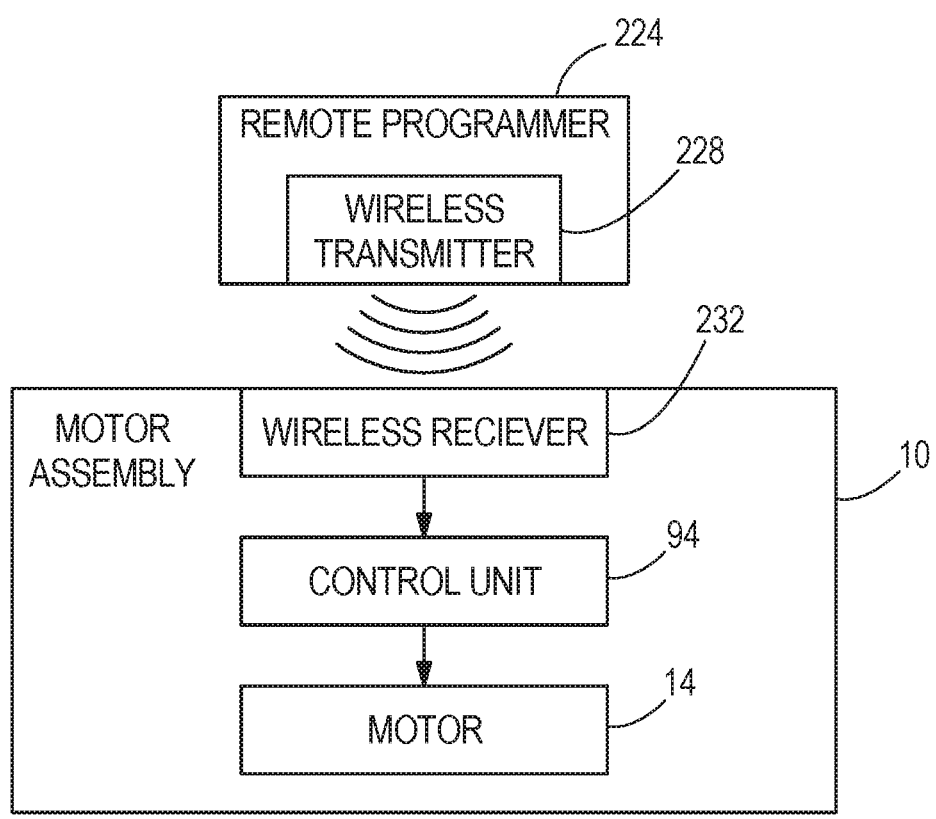
FIG. 9 is a block diagram of a system including a wireless communication interface.

FIGS. 8A and 8B illustrate just two examples of operation of the motor assembly 10 based on the operating state of a condenser motor 126. Any number of different speed profiles can be configured by the user to operate the motor assembly 10 in response to the state detection circuitry 98. The modes and speed profiles are configurable via programming of the control unit 94 by the user. The control unit 94 can be programmed at the factory or at a later time through an interface coupled to the device housing 22 (e.g., a communication interface connection, buttons, or knobs). Alternatively, the control unit 94 can be programmed by using an external programming device. As illustrated in FIG. 9, a remote programmer 224 (e.g., a smartphone device) including a wireless transmitter 228 is used to transmit information regarding the speed profile configurations to a wireless receiver 232 positioned within the motor assembly 10. The wireless receiver 232 then provides the speed profile configuration to the control unit 94 which subsequently controls the motor 14 as prescribed.

Various features and advantages of the invention are set forth in the following claims.

What is claimed is:
1. A motor assembly configured to receive an external alternating voltage, the motor assembly comprising:
    a motor including a stator and a rotor rotatable about a longitudinal axis; and
    a circuit assembly, the circuit assembly including
        a state detector including a discrete high voltage input, a first line voltage input, and at least one selected from the group consisting of a neutral line voltage input and a second line voltage input, the state detector operable to detect whether a compressor is receiving the external alternating voltage based on a first comparison of the discrete high voltage input to the first line voltage input and a second comparison of the discrete high voltage input to the at least one selected from the group consisting of the neutral line voltage input and the second line voltage input, and
        a control unit operable to control the motor based on whether the compressor is receiving the external alternating voltage.

2. The motor assembly of claim 1, wherein the motor assembly further includes a fan coupled to the rotor for co-rotation.

3. The motor assembly of claim 1, wherein the control unit controls the motor by applying one of a plurality of configurable speed profiles in response to whether the compressor is receiving the external alternating voltage.

4. The motor assembly of claim 3, wherein the speed profiles are programmable by the control unit receiving an input regarding a characteristic of the speed profiles.

5. The motor assembly of claim 4, wherein the characteristic of the speed profiles to be programed is a rotational speed as a function of time.

6. The motor assembly of claim 4, wherein the characteristic of the speed profiles to be programed is a rotational direction.

7. The motor assembly of claim 4, wherein the control unit receives an input regarding the characteristic of the speed profiles wirelessly using a wireless transmitter and receiver.

8. The motor assembly of claim 1, wherein the compressor is a refrigerator system compressor.

9. The motor assembly of claim 1, wherein the state detector is configured to determine if there is an open connection, a neutral connection, or a line connection.

10. The motor assembly of claim 1, wherein the state detector generates a first logic output signal and a second logic output signal received by the control unit, the first logic output signal indicating whether the external alternating voltage is equal to a neutral connection and the second logic output signal indicating whether the external alternating voltage is equal to a line connection.

11. The motor assembly of claim 10, wherein the control unit determines whether the compressor is receiving the external alternating voltage based on the first logic output signal and the second logic output signal.

12. The motor assembly of claim 10, wherein the state detector includes an optical isolation device to isolate the control unit from the external alternating voltage.

13. The motor assembly of claim 1, wherein the circuit assembly includes a disc-shaped circuit board mounted co-axially with the longitudinal axis.

14. The motor assembly of claim 1, wherein the motor assembly includes a voltage input to power the motor.

15. The motor assembly of claim 1, further comprising a housing substantially encasing the motor and the circuit assembly.

16. The motor assembly of claim 15, wherein the housing includes a motor case, and a front cover substantially encasing the motor and the circuit assembly.

17. The motor assembly of claim 15, wherein the compressor is outside of the housing.

18. A refrigeration system comprising:
a line input;
a neutral input;
a compressor electrically coupled to the line input and the neutral input; and
a motor assembly including
a stator,
a rotor,
a state detector electrically coupled to the line input, the neutral input, and the compressor, the state detector configured to
detect whether a compressor is receiving the external alternating voltage based on a first comparison of the discrete high voltage input to the first line voltage input and a second comparison of the discrete high voltage input to the at least one selected from the group consisting of the neutral line voltage input and the second line voltage input, and
output a signal indicative of the compressor being detected, and
a control unit galvanically isolated from the line input, the control unit operable to
receive the signal, and
control the motor based on the received signal.

19. The refrigeration system of claim 18, wherein the control unit powers the motor on when receiving the first signal and powers the motor off when receiving the second signal.

20. The refrigeration system of claim 18, wherein the state detector outputs at least one selected from a group consisting of the first signal and the second signal, the output being based on a first comparison of the line input to a discrete high voltage input and determining whether the line input and the discrete high voltage input are equal, the output being further based on a second comparison of the neutral input to the discrete high voltage input and determining whether the neutral input and the discrete high voltage input are equal.

* * * * *